Sept. 22, 1936.                A. THOMAS                    2,055,186
            MACHINE FOR VERIFYING PERFORATED RECORD CARDS
                    Filed Dec. 12, 1934          3 Sheets-Sheet 2
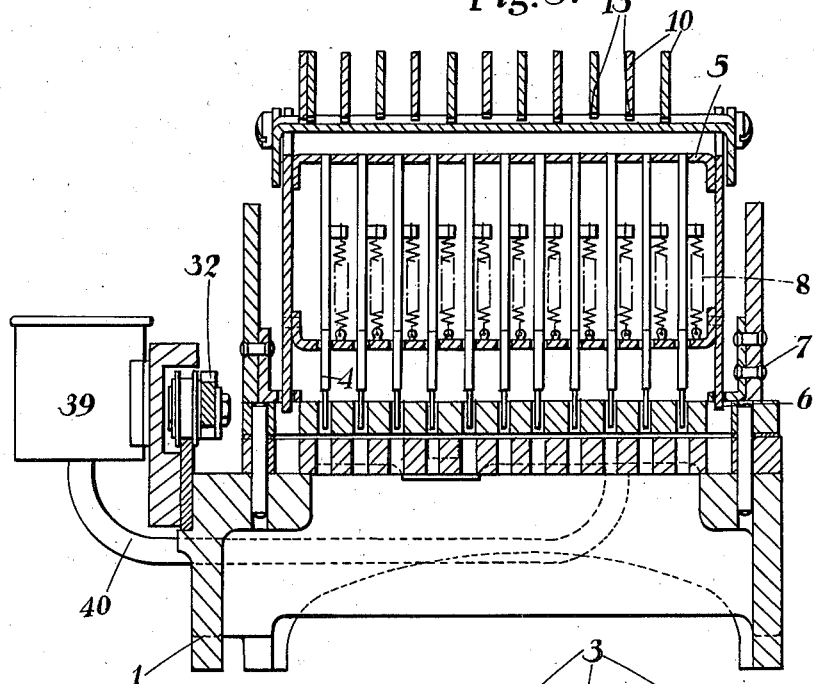
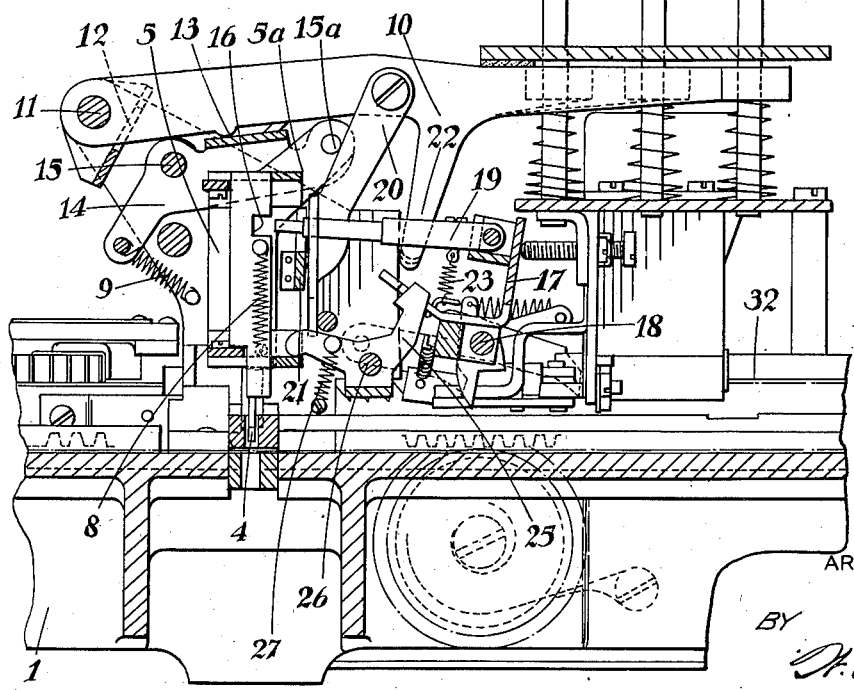
INVENTOR
ARTHUR THOMAS Sept. 22, 1936.　　　　A. THOMAS　　　　2,055,186
MACHINE FOR VERIFYING PERFORATED RECORD CARDS
Filed Dec. 12, 1934　　　3 Sheets-Sheet 3
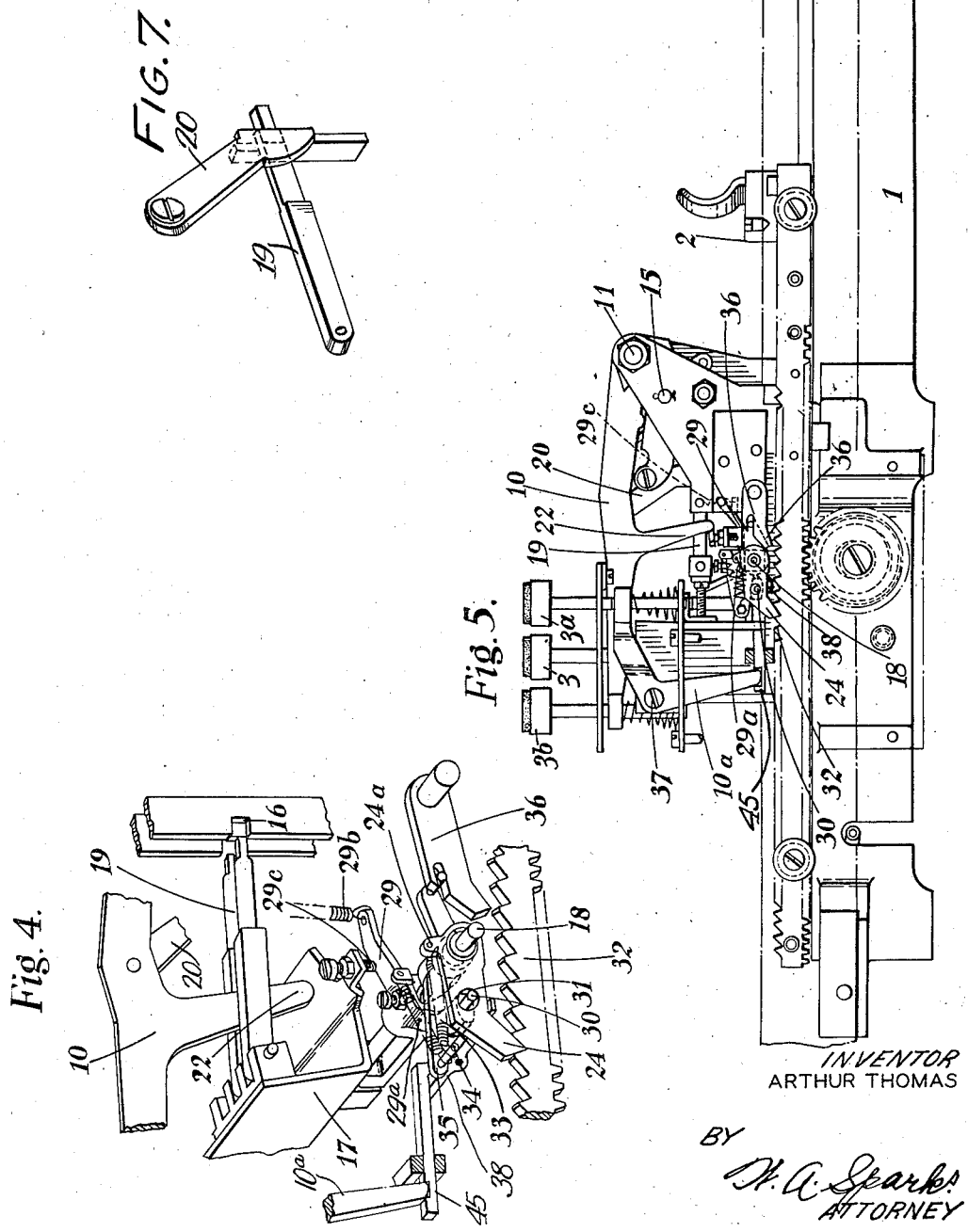
INVENTOR
ARTHUR THOMAS
BY
W. A. Sparks
ATTORNEY Patented Sept. 22, 1936

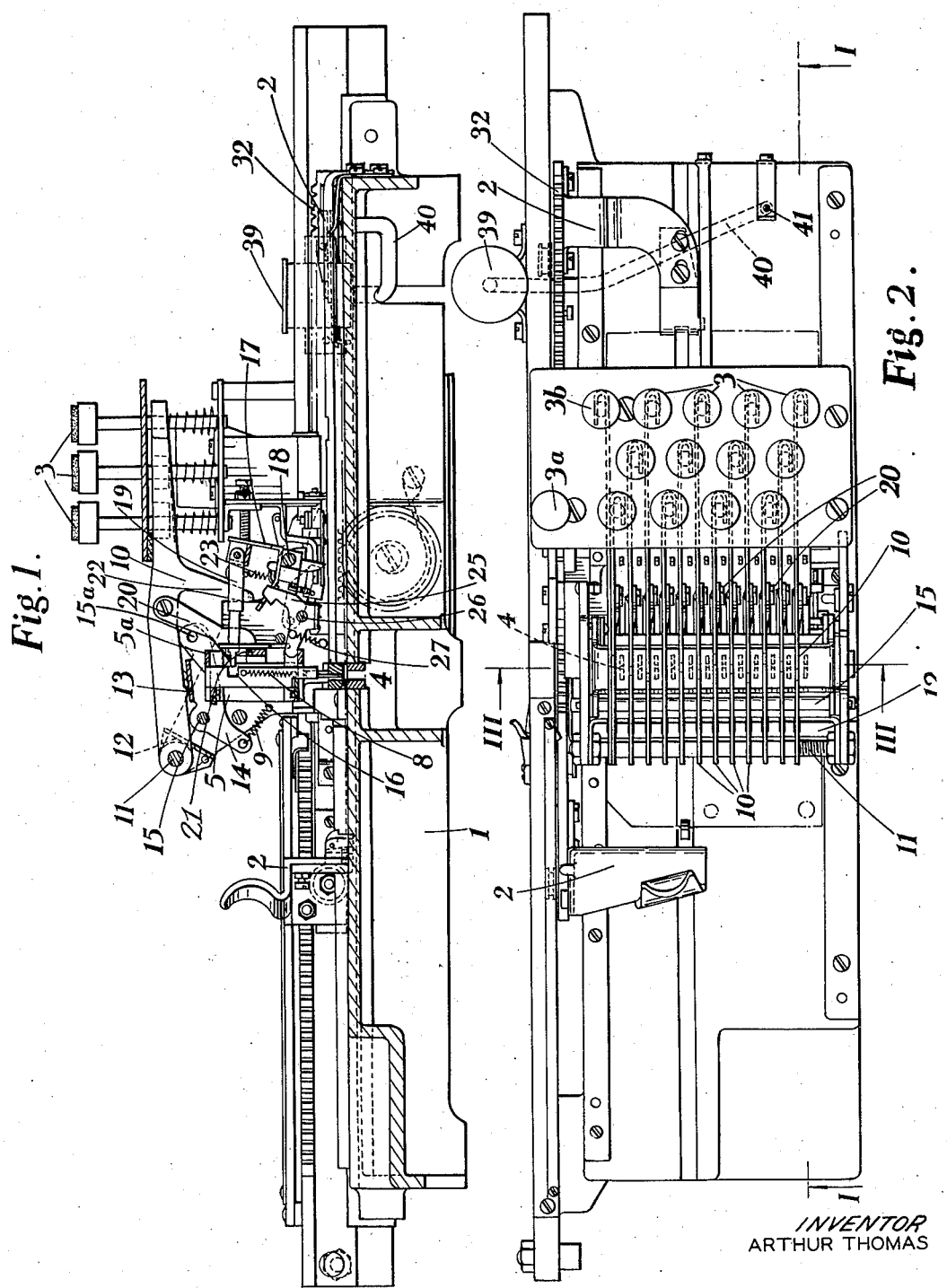

2,055,186

UNITED STATES PATENT OFFICE 2,055,186

MACHINE FOR VERIFYING PERFORATED RECORD CARDS

Arthur Thomas, Wallington, England, assignor to The Accounting & Tabulating Corporation of Great Britain Limited, London, England Application December 12, 1934, Serial No. 757,105
In Great Britain December 15, 1933

10 Claims. (Cl. 73—51)

This invention relates to machines for verifying perforated record cards, and has for its object to provide a machine which will not only indicate whether a perforation is incorrectly placed in a card, but also if an erroneous perforation exists in the same column as a correctly placed perforation.

The invention further has for its object to provide a machine comprising a column of sensing pins, containing as many sensing pins as there are index positions in a card column, a column of comparing elements each adapted to move with a corresponding one of said sensing pins, a plurality of keys, one for each index position in a column, an operative connection between each key and all the sensing pins whereby depression of any key actuates all the pins to read a card column, a testing member for each comparing element and operative connections between each key and all the testing members, whereby depression of a key moves all the testing members towards the comparing elements simultaneously with the movement of all the sensing pins towards the card, means for preventing completion of the movement of the testing members towards the comparing elements when the position of a sensing pin does not agree with the position of the corresponding key, and means for giving an indication when the testing members are thus prevented from completing their movement.

Preferably the comparing elements are integral with the sensing pins and comprise recesses or notches formed in one edge of each pin, the comparing notches being arranged substantially at right angles to the comparing elements.

In the normal position of the parts the testing elements have their ends opposite the recesses in their respective comparing elements.

If now a card is in the machine having a perforation in the 4-position in the column which is under the pins and the 4 key is depressed the pins will all move down on to the card and all except the 4 pin will be held up thereby. The testing member corresponding to the 4 pin will also be lowered so that its end is still opposite the comparing notches in the corresponding sensing pin. Consequently, continued depression of the key will bring all the testing members towards the comparing notches and the ends of all the testing elements will be able to enter the notches.

Complete depression of the key actuates the escapement of the carriage carrying the card, thereby allowing the latter to move forward one step to the next column.

If on the other hand a key is depressed for which there is no corresponding hole in the card, the corresponding sensing pin will be held up and the associated testing member will be unable to move forward, since it will have been moved down by its key, and on attempting to move forward will engage with the edge of the sensing pin below the notch, so that its further movement is obstructed. Consequently, the key cannot be depressed sufficiently to permit actuation of the escapement.

Similarly, if there is a hole in the card and the corresponding key is not depressed the sensing pin for that hole will descend to its lowermost position, but the associated testing member will not be lowered. Consequently, when this testing member moves forwardly it will strike the sensing pin above the notch and be obstructed thereby. Consequently, the key which is being actuated cannot move down to the fullest extent and the escapement will be unable to operate.

In order that the invention may be clearly understood, it will now be described with reference to the accompanying drawings, in which:—

Fig. 1 is a diagrammatic sectional side elevation of the machine, taken along the line I—I of Fig. 2, looking in the direction of the arrows;

Fig. 2 is a plan view of the machine;

Fig. 3 is a section through the line III—III of Fig. 2;

Fig. 4 shows on an enlarged scale details of the card carriage escapement mechanism;

Fig. 5 is a side elevation of the machine showing the card carriage escapement mechanism;

Fig. 6 shows on an enlarged scale part of the mechanism of Fig. 1, and

Fig. 7 is an isometric view of the fork for operating a testing pin, showing also the cooperating testing pin.

In the drawings like reference numerals designate the same or similar parts.

Referring to the drawings the apparatus comprises a base plate 1 having a card carriage 2 operated step by step by an escapement on depression of one of the keys 3.

Twelve keys are provided for sterling work, or if desired ten only may be provided for decimal work.

Across the machine is disposed a column of sensing pins and there are also provided 12 keys any one of which when depressed actuates all the sensing pins. In addition two further keys 3a and 3b are provided, the function of which will be described later.

These sensing pins are carried in a frame 5 adapted to slide vertically in slots 6 in brackets 7 secured to the frame of the machine, the pins being connected to the frame 5 by springs 8 tending to pull them downwardly.

The end pieces of frame 5 have integral therewith lugs 5a which are pivoted to a rocking frame 14 at 15a. The rocking frame 14 is pivoted to the main frame of the machine at 15 and normally holds the frame 5 in its upper position by springs 9 secured at one end to the rocking frame 14 and at the other end to the main frame of the machine.

Each key 3 is connected to a key lever 10 by means of the end of the lever being turned over to engage a flat portion in the key stem, and all these key levers are pivoted at 11 on a bar 12 slotted to receive the levers and fixed to the frame work of the machine and disposed on the other side of the pin carrying frame from that on which the keys are situated. Each key lever carries a downward projection 13 normally resting on the top of the frame 14, so that when any key is depressed the pin carrying frame is lowered.

The upper portions of the sensing pins are in the form of flat bars having comparing recesses or notches 16 in the edges facing the keys.

Below the key levers is an angle plate 17 pivoted to the machine frame at 18 and having one part horizontal and the other part vertical and rising from the horizontal part. This angle plate is so pivoted to the frame that when it is rocked about its pivot 18 the horizontal part swings downwardly and the vertical part swings forwardly towards the sensing pins. At the top of the vertical part of the angle plate 17 a number of testing pins 19 are pivoted the free ends of these pins being disposed normally opposite the comparing notches 16 in the upper parts of the sensing pins.

The testing pins are normally held up by forked members 20 (see Fig. 1) depending from the key levers the free ends of the pins being held in the bottom of the forks by springs 23. The extreme ends of the pins extend through a fixed slotted bar 21 and are guided thereby.

Also depending from each key lever is a lug 22 adapted to engage with the horizontal part of the angle plate 17 and rock the latter to move its horizontal portion downwardly, thereby bringing all the testing pins 19 forward. Thus, depression of any given key will tend to move all the sensing pins 4 downwardly; to permit the corresponding testing pin 19 to move downwardly due to the downward movement of the corresponding forked member 20, and in addition will tend to rock the angle plate 17 to move all the testing pins forwardly.

In using the machine a card is inserted in the carriage 2 and the keys 3 are depressed in accordance with the arrangement of perforations which should be in the card. If a key is depressed and the correct perforation is present, then the pin frame 5 will move down, but all the pins except that corresponding to the perforation will be held up while the pin corresponding to the perforation will go down through the card. The depression of the key permits the corresponding testing pin 19 to move downwardly and the depending lug 22 on the key lever will rock the angle plate 17, thereby moving all the testing pins forwardly.

All testing pins 19 corresponding to the sensing pins 4 which have been held up will also have remained up, since their keys have not been depressed. The testing pin corresponding to the sensing pin which has been moved down will also have moved down since its key has been depressed.

Thus, the ends of the testing pins will all remain opposite the comparing notches in the corresponding sensing pins and all the testing pins will be able to move forward into these notches, so that the key can be depressed to its fullest extent, thereby rocking the angle plate to a sufficient extent to operate the escapement hereinafter described.

If a hole which should be present has been omitted or is in another position, then the sensing pin corresponding to the key which has been depressed will remain up and the corresponding testing pin will be obstructed by engaging the edge of the sensing pin below the comparing notch, thereby preventing the angle plate from being rocked sufficiently to operate the escapement.

Also, if there is another hole in the column in addition to the correct hole, the pin corresponding to this erroneous hole will have moved down, but its corresponding testing pin will have remained up, and therefore, will be unable to move forwardly, so that again the escapement mechanism cannot operate.

The escapement mechanism is of the usual pawl operated type, and its pawl 24 is loosely mounted on the shaft 18 of the rocking angle plate 17 and is operated from plate 17 by an arm 29 integral with a further arm 29a both of which are free on the shaft 18, the arm 29 being connected to the machine frame by a spring 29b (Fig. 4). The horizontal portion of the angle plate 17 carries a projection 29c which when the plate 17 is rocked engages with the arm 29 and rocks it together with the arm 29a. The arm 29a has a pin 30 engaging in a hole 31 in the pawl 24, this hole being larger than the pin 30, so that only when the angle plate is rocked to the fullest extent is the pawl 24 lifted sufficiently to release the carriage which, however, will be held by a second pawl 36 which is moved into engagement with the rack 32 as pawl 24 is lifted.

The pawl 24 is normally held in engagement with the rack 32 by means of a spring 33 connected at one end to a projection 24a formed on the pawl and at the other end to a pin 34 provided on a crank 35 carried by shaft 18.

In order to prevent the escapement from operating before the sensing pins have risen clear of the card, a latch 25 is provided pivoted to the frame at 26. One end of the latch rests on the pin-carrying frame 5 and is provided with a spring 27 which causes the other end of the latch to engage the angle plate 17 on the downward stroke. The disengagement is effected by the rising of the pin carrying frame which lifts the tail of the latch. The angle plate then returns to its original position and pawl 36 is lifted to allow the rack to move one tooth before the pawl 24 again engages with the rack.

A carriage release key 3a may be provided having a key lever 10a pivoted to the machine frame at 37 and operating upon a slide 45 having a cam shaped lower edge which causes a lever 38 to lift pawl 24 from engagement with rack 32.

A space key 3b may also be provided to operate the escapement over columns in which no hole exists, this space key being provided with a key lever 10 similar to that employed for the keys 3, except that it has no corresponding testing pin 19.

When there is no hole in the card all the pins are held up and as only the space key is depressed all the testing pins are also held up.

The space key moves the sensing pin carrying frame downwards and also rocks the angle plate. Since all the sensing pins are held up and all the testing pins are also held up the latter can all move into the recesses and the rocking plate can move to the extent sufficient to operate the escapement.

If, however, the space key is depressed and there is a hole in the column under the sensing pins then one pin will pass through the hole and the corresponding testing member cannot move forward, thereby indicating the error.

An inking device may be provided for marking the cards as they pass through the machine so as to give an indication that the cards have been verified.

This inking device comprises an ink container 39 secured to the side of the machine and having a conduit 40 containing a wick which is passed through the base of the machine at 41 to contact with and mark the cards as they pass through the machine.

Although the machine has been described as provided with 12 keys 3 any one of which on depression actuates all the sensing pins 4, the number of such keys 3 may be varied to suit the class of card to be verified by a particular machine, e. g. cards bearing alphabetical or code punchings.

What I claim is:—

1. A machine for verifying the data perforated in statistical record cards comprising a column of sensing pins, said column containing as many sensing pins as there are index positions in a card column, a column of comparing elements each integral with a corresponding one of said sensing pins, a plurality of keys, one for each index position in a column, an operative connection between each key and all the sensing pins whereby depression of any key actuates all the pins to read a card column, a testing member for each comparing element and operative connections between each key and all the testing members, said operative connections serving upon depression of a key to move all the testing members towards the comparing elements simultaneously with the movement of all the sensing pins towards the card, means for preventing completion of the movement of the testing members towards the comparing elements when the position of a sensing pin does not agree with the position of the corresponding key, and means for giving an indication when the testing members are thus prevented from completing their movement.

2. A machine for verifying the data perforated in statistical record cards comprising a column of sensing pins, said column containing as many sensing pins as there are index positions in a card column, a column of comparing elements each integral with a corresponding one of said sensing pins, a card carriage, an escapement mechanism adapted to operate said carriage, step by step, a plurality of keys, one for each index position in a column, an operative connection between each key and all the sensing pins, said operative connection serving upon depression of any key to actuate all the pins to read a card column, a testing member for each comparing element and additional operative connections between each key and all the testing members, said additional connection serving upon depression of a key to move all the testing members towards the comparing elements simultaneously with the movement of all the sensing pins towards the card, means for preventing completion of the movement of the testing members towards the comparing elements when the position of a sensing pin does not agree with the position of the corresponding key, and an operative connection between said testing members and the card carriage escapement mechanism to prevent said escapement mechanism from being operated by any one of said keys when the corresponding testing member fails to complete its movement.

3. A machine for verifying the data perforated in statistical record cards comprising a column of sensing pins, said column containing as many pins as there are index positions in a card column, a column of comparing elements each integral with a corresponding sensing pin, a plurality of keys, one for each index position in a column, an operative connection between each key and all the sensing pins, which serves upon depression of any key to cause all the sensing pins to read a card column, a pivoted testing member for each comparing element, each of said comparing elements comprising a recess in which the end of the corresponding testing member is adapted to engage, operative conections between each key and all the testing members, which serve upon depression of a key to pivot the corresponding testing member so that the free end thereof is moved towards the card and to move all the testing members substantially linearly towards the comparing elements, on the depression of the keys corresponding with the sensing of a card column, each testing member is allowed to enter in its corresponding comparing element to allow completion of the movement of the testing members towards the comparing elements, and means for giving an indication when any testing member fails to enter the recess in the corresponding comparing elements.

4. In a machine according to claim 3, a card carriage, an escapement mechanism adapted to operate said carriage step by step to present card columns successively to the sensing pins and an operative connection between the testing members and said escapement mechanism, to prevent said escapement mechanism from being operated by any one of said keys when the corresponding testing member fails to enter the recess in its corresponding comparing element.

5. A machine for verifying the data perforated in statistical record cards comprising a frame, a column of sensing pins resiliently mounted in said frame, a column of recessed comparing elements integral with said sensing pins, a plurality of keys, one for each index position in a column, a corresponding number of levers pivoted to the machine frame and contacting with the pin carrying frame, each key being operative upon its corresponding lever to move the frame at right angles to the plane of the card to cause the sensing pins to read a card column, a testing member for each recording element and operative connections between each key and all the testing members, said connections serving upon depression of a key to move all the testing members substantially linearly into the comparing elements simultaneously with the movement of all the sensing pins towards the card, the construction and arrangement being such that said comparing elements prevent completion of the movement of the testing members into the comparing elements when the position of a sensing pin does not agree with the position of the corresponding key, and means for giving an indication when the testing members are thus prevented from completing their movement.

6. A machine for verifying the data perforated in statistical record cards comprising a frame, a column of sensing pins resiliently mounted in said frame, a column of comparing elements integral with said sensing pins, a plurality of keys, one for each index position in a column, a corresponding number of levers pivoted to the machine frame and contacting with the pin carrying frame, each key being operative upon its corresponding lever to move the pin carrying frame at right angles to the plane of the card to cause the sensing pins to read a card column, a rockable bar, a testing member for each comparing element pivoted at one end in said rockable bar, each of said comparing elements comprising a recess in which the end of the corresponding testing member is adapted to engage, means provided on each lever for supporting the corresponding testing member to depress the free end of said testing member upon depression of the corresponding key, and operative connections between each key and said rockable bar such that depression of a key also rocks the bar and moves all the testing members towards the comparing elements, whereby if the depression of the keys corresponds with the sensing of a card column, each testing member is enabled to enter the recess in its corresponding comparing element, and means for giving an indication when any testing member fails to enter the recess in its corresponding comparing element.

7. In a machine according to claim 6 and in which the rockable bar is in the form of an angle plate pivoted to the frame of the machine, means provided on each key lever for rocking said angle plate upon depression of a key, the testing members being pivoted at their ends to said angle plate, whereby depression of a key moves all the testing members towards the comparing elements, a card carriage, an escapement mechanism for said carriage and an operative connection between said escapement mechanism and said angle plate to provide actuation of said escapement mechanism when a complete movement of said angle plate is permitted due to all the testing members entering the recesses in their respective comparing elements, and inoperative to actuate said mechanism when said angle plate by failure of any testing member to enter a recess does not move its full amount.

8. A machine for verifying the data perforated in statistical record cards comprising a frame, a column of comparing elements resiliently mounted in said frame, a column of sensing pins integral with said comparing elements, a card carriage, an escapement mechanism adapted to operate said carriage step by step, a plurality of keys, one for each index position in a column, a corresponding number of levers pivoted to the machine frame and contacting with the pin carrying frame, each key being operative upon its corresponding lever to move the pin carrying frame at right angles to the plane of the card to cause the sensing pins to read a card column, a testing member for each comparing element, each of said comparing elements comprising a recess in which the end of the corresponding testing member is adapted to engage, means provided on each lever for supporting the corresponding testing member, to depress said testing member upon depression of the corresponding key, an angle plate pivoted to the frame of the machine, means provided on said angle plate for releasing the card carriage escapement mechanism upon complete depression of one or more keys, means provided on each key lever for rocking said angle plate upon depression of a key, the testing members being pivoted at their ends to said angle plate, whereby depression of a key moves all the testing members towards the comparing elements, whereby if the depression of the keys corresponds with the sensing of a card column, each testing member is enabled to move into its corresponding comparing element so as to allow complete depression of the key and actuation of the card carriage escapement mechanism.

9. In a machine according to claim 8 a catch pivoted intermediate its ends to the frame of the machine and contacting at one end with the pin carrying frame and at the other end with the rocking angle plate to hold said plate against movement in the return direction, said catch being adapted to release said angle plate when the latter is rocked by the pin carrying frame withdrawing from the card upon the return movement of the keys, the means provided on said angle plate for releasing the card carriage escapement mechanism being operative only during the return movement of the angle plate, whereby the card carriage is prevented from moving until the sensing pins have left the card.

10. In a machine according to claim 3 a space key and an operative connection between said space key and all the sensing pins, whereby depression of said key moves all the sensing pins to read a card column, so that if there is a hole in the card column, one pin will pass through the hole and the corresponding testing member will be unable to move, thereby indicating the error.

ARTHUR THOMAS.